United States Patent [19]

Kaufman

[11] 4,294,515
[45] Oct. 13, 1981

[54] VIRTUAL IMAGE DISPLAY APPARATUS

[76] Inventor: Arthur Kaufman, 19 Covlee Dr., Westport, Conn. 06880

[21] Appl. No.: 23,160

[22] Filed: Mar. 23, 1979

[51] Int. Cl.³ .................... G02B 27/14; G02B 5/10
[52] U.S. Cl. ............................... 350/174; 350/296
[58] Field of Search ............ 350/174, 291, 296, 293,
350/298; 358/250, 238, 239, 185; 352/4;
353/98, 99; 272/8 M, 8.5, 13; 356/251, 252,
254, 255

[56] References Cited

U.S. PATENT DOCUMENTS

| | | | |
|---|---|---|---|
| 1,355,397 | 10/1920 | Heylmun | 350/296 |
| 2,113,397 | 4/1938 | Croft | 350/296 |
| 2,165,078 | 7/1939 | Toulon | 350/296 |
| 2,165,736 | 7/1939 | Twele | 272/8.5 |
| 2,182,099 | 12/1939 | Sullivan | 350/296 |
| 2,484,379 | 10/1949 | Goldberg | 353/99 |
| 2,895,372 | 7/1959 | Tacklind et al. | 356/252 |
| 3,446,916 | 5/1969 | Abel et al. | 350/174 |
| 3,536,832 | 10/1970 | Zipse et al. | 358/250 |
| 3,589,796 | 6/1971 | Schaefer | 350/296 |
| 3,723,805 | 3/1973 | Scarpino et al. | 350/174 |
| 3,816,005 | 6/1974 | Kirschner | 350/174 |
| 3,824,535 | 7/1974 | Rover | 350/174 |
| 3,836,263 | 9/1974 | Rickert | 350/174 |
| 3,870,405 | 3/1975 | Hedges | 350/174 |
| 3,905,708 | 9/1975 | Steck | 350/174 |
| 3,923,370 | 12/1975 | Mostrom | 358/250 |
| 3,942,901 | 3/1976 | Ekstrand | 350/174 |
| 4,026,641 | 5/1977 | Bosserman et al. | 350/174 |

FOREIGN PATENT DOCUMENTS

| | | | |
|---|---|---|---|
| 1003137 | 3/1957 | France | 350/296 |
| 2242695 | 3/1975 | France | 350/174 |
| 559678 | 3/1957 | Italy | 350/296 |

*Primary Examiner*—Jon W. Henry
*Attorney, Agent, or Firm*—Albert F. Kronman

[57] ABSTRACT

A virtual image display device for alpha-numeric and pictorial information. A concave spherical mirror segment magnifies and reflects an image from an image source. The image source is mounted between the focus of the mirror and the said mirror and parallel to its optical axis. The virtual image thereby formed is visible to the viewer in front of the mirror.

In related embodiments, the concave mirror segment can be made partially reflective and placed in front of a camera lens to allow a camera to photograph through it. A planar mirror can also be included to fold the light path of the display and thereby reduce the size of the apparatus.

18 Claims, 6 Drawing Figures

VIRTUAL IMAGE DISPLAY APPARATUS

BACKGROUND OF THE INVENTION

This invention is a device for displaying alphanumeric and pictorial information in an enlarged format. Such a device has utility as an advertising display panel, a prompting device, closed circuit television display or photographic projector. It can also be used in place of other apparatus commonly used for imaging texts and pictures.

Visible displays have been produced in the prior art by projecting an image, often termed a "real image," on a screen. Since the image is formed on the screen surface, its size is limited to that of the screen itself. This real image appears to grow smaller, and, therefore, more difficult to see, as a viewer's distance from the screen increases. Real images on a screen are also degraded by ambient light.

Where visual information is produced for prompting purposes, the screen must display enough words for a performer to read his script comfortably. It is often difficult to use characters large enough so that they can be read from a distance and still fit on the small cathode ray screens currently in use. Moreover, such present day displays cannot be enlarged readily.

Airlines also use closed circuit television systems in their terminals to make flight information available to their passengers. These screens too must show so much information on a small area that they are difficult to read from a distance.

The present invention overcomes many of the difficulties with prior art devices by producing a magnified virtual image display. The virtual image, created by its concave mirror, is more readily shielded from ambient light than are real image displays. Unlike prior art devices employing flat mirrors, the curved virtual image apparatus can magnify its display so that it can be read at a distance. The degree of magnification can be varied readily if desired.

Another object of the present invention is to provide a means for viewing information in front of a photographic or television camera for prompting purposes. In this embodiment, the virtual image display apparatus will provide a script for a performer that he can read in a studio while he is looking directly at the camera.

Still another object of the present invention is to provide a prompting device which can be used outdoors or in the presence of high levels of ambient light.

SUMMARY OF THE INVENTION

A virtual image display apparatus according to the present invention comprises a concave mirror segment and an off axis image projection device directed at said mirror. Said information projection device may be a small television tube, or any other analogous form of illuminated image projecting device. The spherical mirror segment reflects the projected light and magnifies the projected image. Various embodiments are shown and described in which the information is projected through different optical configurations to achieve specific spatial and optical advantages. Several types of mirrors are also disclosed for use in the present invention.

DESCRIPTION OF THE DRAWINGS

In the accompanying drawings forming a part hereof, similar parts have been given identical reference numerals, in which drawings.

DETAILED DESCRIPTION

Figure 1:
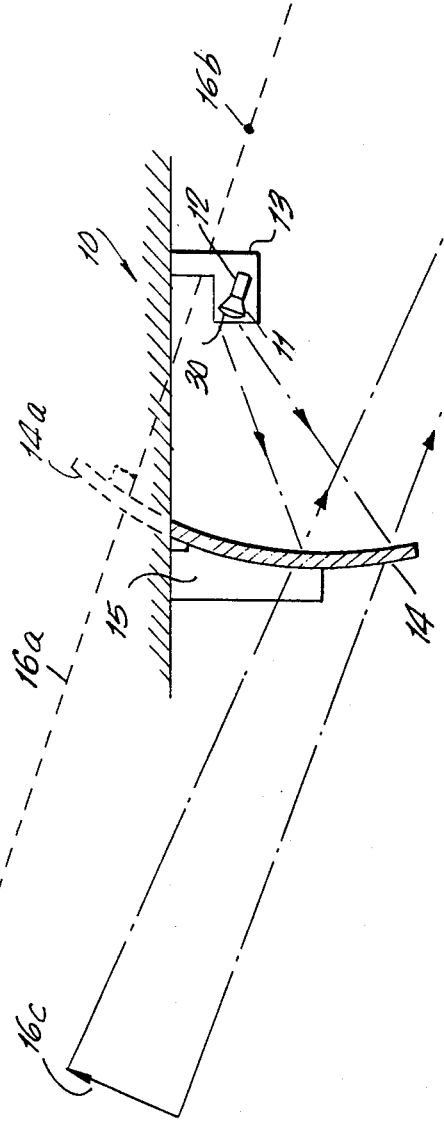
FIG. 1 is a somewhat diagrammatic side view, partially in section, of one complete embodiment of the present invention.

Referring to the drawings, and FIG. 1 in particular, 10 indicates one complete embodiment of a virtual image display device made in accordance with the present invention. Said embodiment is particularly well suited for large format displays in airline terminals, train stations, and other places where information must be read easily at a distance.

The virtual image display device 10 comprises an information projection device 11, hereinafter referred to as an image source, and a curved mirror segment 14 to receive light from said projection device. The image source illustrated at 11 is intended to depict a cathode ray tube 12, a thin film electroluminescent display, a liquid crystal display-rear or front illuminated, an illuminated film, a light emitting diode array, electroluminescent panel, filament lamp, gaseous plasma discharge cell or analogous unit. The image source 11 is mounted in an enclosure 13 and its image display face 30 is substantially normal to the optical axis 16a and is preferably shielded from ambient light by said enclosure. In the present embodiment, the image source 11 is suspended from the ceiling of a room, but other supports may be used to suit the location of the image source apparatus.

The image source 11 is directed at a concave spherical mirror segment as used herein is intended to mean a concave portion of a larger hemispherical mirror structure indicated by dashed lines 14a in FIG. 1. Mirror segment 14 is held stationary at some predetermined distance below and in front of image source 11 as by bracket 15.

In the embodiment shown in FIG. 1, mirror segment 14 is fully aluminized, preferably front surface. It magnifies the image received from the image source 11 and reflects it toward the viewers 29 located at some distance below and behind enclosures 13. The viewers 29 are represented by the schematic eye 29.

Every concave spherical mirror, has a focus and an optical axis. Said focus is always located at some distance in front of the mirror and on its axis. Rays parallel and close to the optical axis directed at the surface of the concave mirror converge near or at its focus. Any object placed between the focus and the concave mirror will appear to be magnified when viewed by one standing somewhere behind the focus. The closer the object is located to the focus, the more it will be magnified.

The object reflected by the concave mirror will also appear to the viewer as if it is located somewhere behind the surface of the mirror itself. This reflection is commonly called a virtual image.

In FIG. 1, the optical axis of the mirror 14a is designated by the line 16a. The focus of mirror 14a is the point 16b. The image source 11 is positioned between said focus 16b and the mirror 14a to magnify its display. Mirror segment 14 is mounted below the axis 16a so that the display it reflects is not partially blocked from view by the image source 11 and its enclosure 13. Since image source 11 radiated light out over a wide angular range in front of it, it is possible for mirror segment 14 to be positioned below its own axis and yet reflect a portion of this light to the viewer 29. This reflected portion constitutes the desired display of the present invention. The light rays drawn in FIG. 1 show how this so-called off axis projection technique picks up a portion of the light that image source 11 emits and reflects it toward the viewer 29. Said viewer sees the display from the image source 11 as an enlarged virtual image 16c appearing to exist behind mirror segment 14.

Figure 2:
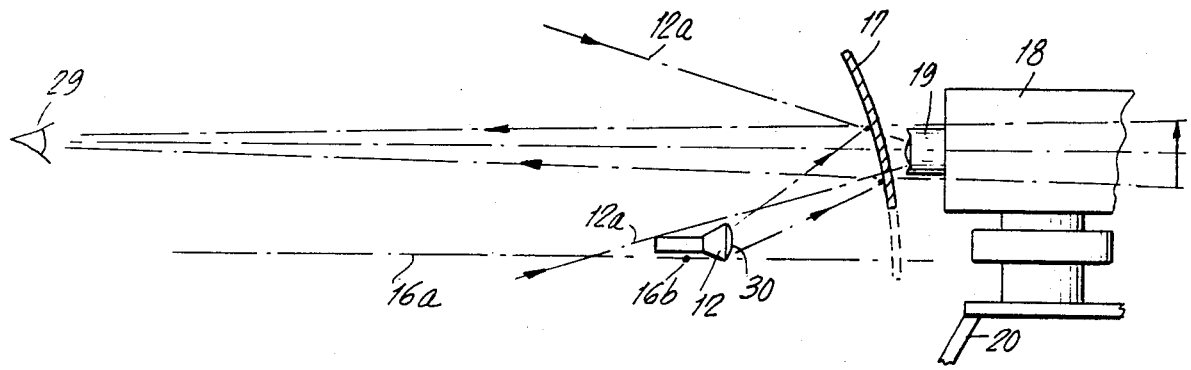
FIG. 2 is a somewhat diagrammatic side view of another embodiment of the present invention.

FIG. 2 shows another embodiment of the present invention in which the virtual image display apparatus is used as a prompting device. The viewer 29 may be at some distance in front of a movie or television camera 18 mounted upon a support 20. This schematic figure again shows a cathode ray tube 12 image source directing a display such as a script on to mirror segment 17. Unlike mirror segment 14, used in the first embodiment of this invention, mirror segment 17 is only partially reflective. Mirror segment 17 is surfaced so that typically 70 to 80% of the incident light enters camera lens 19 after passing through said mirror segment 17. At the same time, mirror segment 17 allows 30 to 20% respectively of the light coming from the image source 11 to be reflected to the viewer 29. The placement of the image source 11 outside of the field of view of the recording camera (indicated by lines 12a) prevents said camera from receiving the display being projected by image source 11. Image source 11 uses a sufficiently intense light so that the viewer 29 can still read the reflected display coming from the 20 to 30% of the light from the mirror segment 17. The remaining 70 to 80% of the light from image source 11 is wasted. The 20 to 30% decrease in brightness of the scene that camera 18 is recording, similarly, is not sufficient to disrupt its proper functioning.

Coating mirror segment 17 with silver, aluminum, or other reflective substances to reflect and transmit light in the above described manner is accomplished by techniques well known in the art and comprise no part of the present invention.

Figure 3:
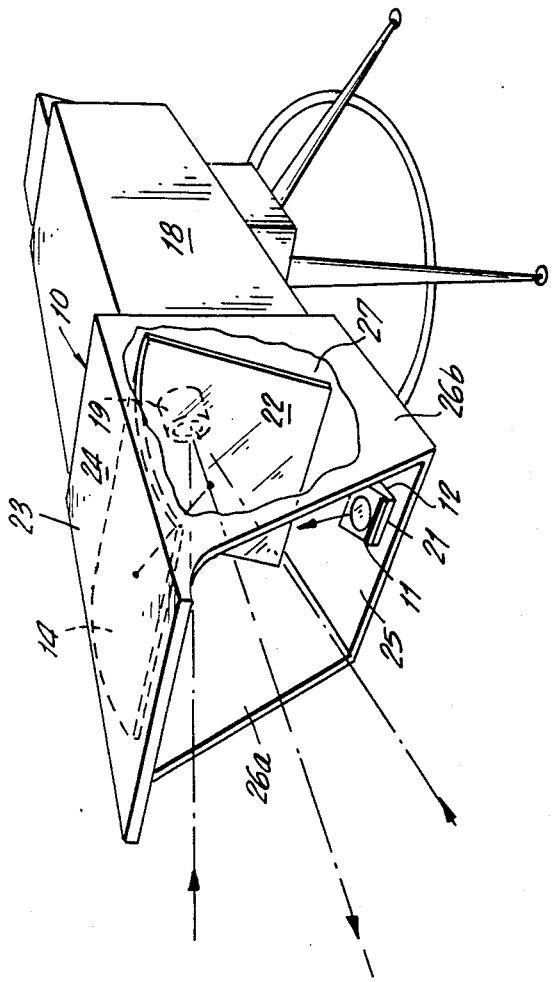
FIG. 3 is a somewhat isometric view, partially broken away, of another complete embodiment of the present invention useful for prompting.
Figure 4:
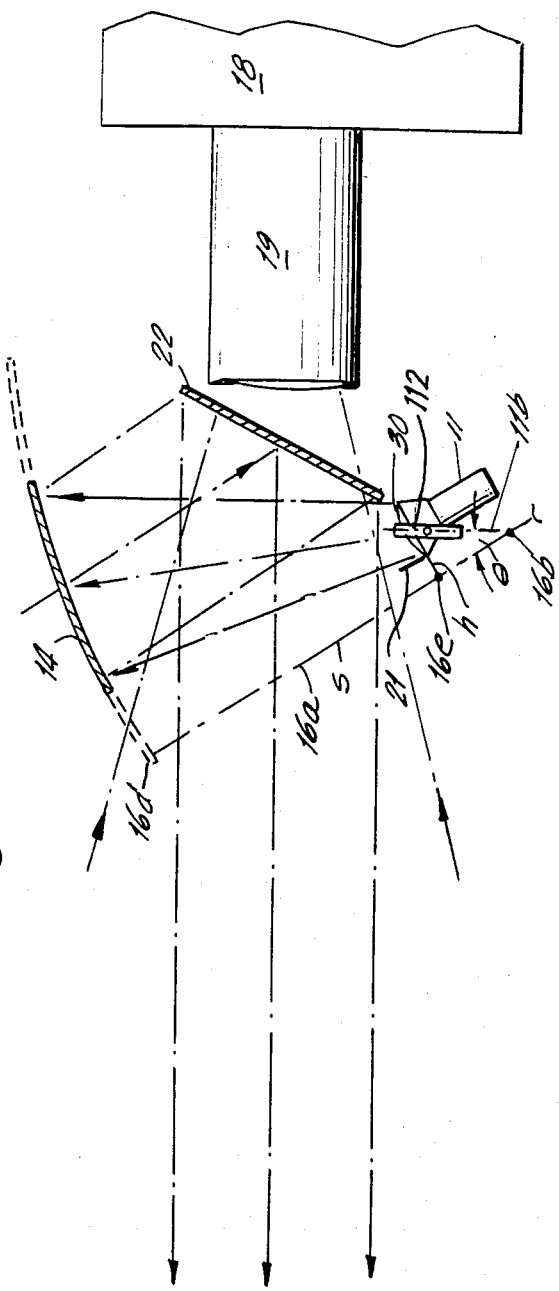
FIG. 4 is a diagrammatic view, partially in section, of the embodiment shown in FIG. 3 illustrating the various light paths.

FIGS. 3 and 4 illustrate a third embodiment of the present invention. This embodiment is similar to FIG. 1 except that the light path of the display reflected from mirror segment 14 is folded once before it is directed to the viewer 29. Folding the light path allows the components of the virtual image display apparatus 10 to be more closely arranged in front of a recording camera 18. A partially reflective plannar mirror 22 is here used to fold the light path. The apparatus of FIG. 3 is contained in a housing 23 having a top 24, bottom 25, spaced sides 26a and b, and back 27. The front of housing 23 is open.

FIG. 4 shows the arrangement of each of the optical components in the embodiment of FIG. 3. The image source 11 is again mounted with its image display face 30 substantially perpendicular to the optical axis 16a of spherical mirror segment 14. Image source 11 is placed inside the focus 16b of mirror segment 14 so that its display is magnified by said mirror. A small baffle 21, mounted on one edge of the image source 11, prevents the viewer from being distracted by light radiating from the edge of the image source's display face 30.

Mirror segment 14 is mounted off its own optical axis 16a as described in previous embodiments. Image source 11 is also mounted off the axis 16a. Mirror segment 14 is fully reflective so that it transmits all the light it receives from source 11 toward planar mirror 22. Planar mirror 22 is mounted in front of camera lens 19. Mirror 22 is coated to have its front surface partially reflective such as, for example, mirror segment 17 described in the second embodiment of this invention.

As noted above, the degree to which a spherical mirror will magnify an object placed before it depends upon its location: The closer the object is placed to the mirror's focus, the more the mirror will magnify its virtual image. Applying this principle to each of the three above described embodiments, it becomes apparent that moving the image source 11 toward focus 16b will increase the magnification of the virtual image display. Moving the source 11 away from the focus 16b decreases the size of the virtual image. Experimentation shows that the image source 11 must be moved along a line 11b which passes through the focus 16b of mirror segment 14, at an angle $\theta$ with respect to axis 16a such that $$\tan \theta = h / (f.l. - s),$$

where h equals the distance from the center of the image source's display face 30 normal 16a; f.l. equals the focal length of the mirror segment 14 (the distance from the optical center 16d of mirror segment 14 to point 16b as measured along axis 16a) and s equals the distance from the point 16e where line he intersects axis 16a to the center 16d of mirror segment 14 measured along axis 16a so that the virtual image of image source 11 in mirror segment 14 will stay at the same height above the optical axis mirror as the magnification is changed.

Image source 11 may be slidably carried by supports 11a to move it along the line 11b to change the magnification.

Figure 5:
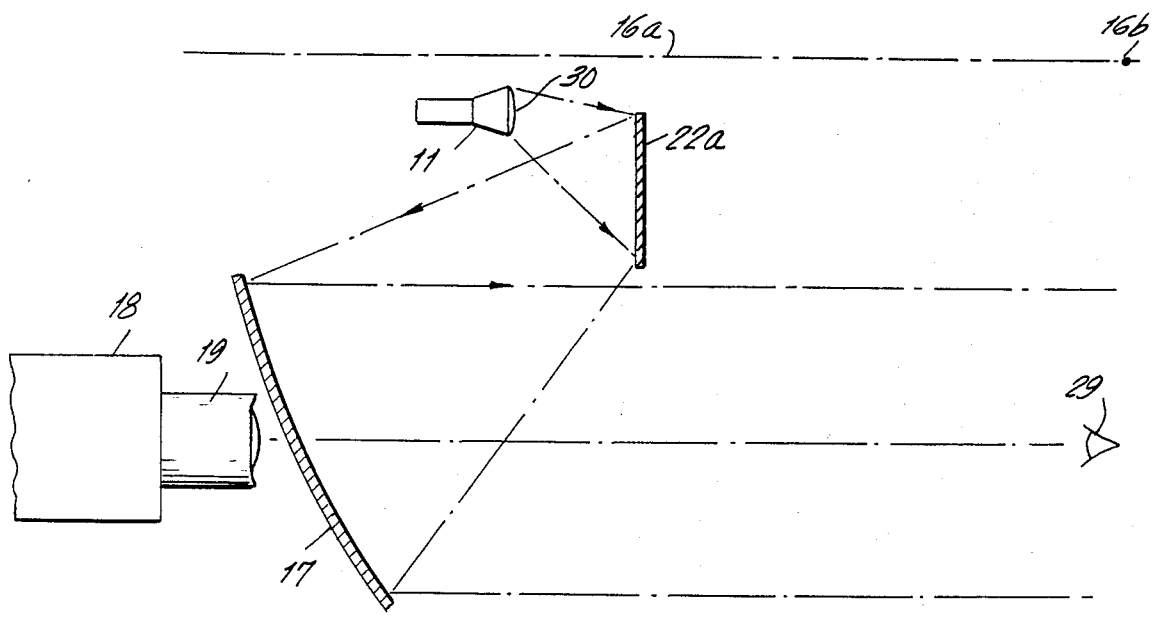
FIG. 5 is a somewhat diagrammatic side view, partially in section, of still another embodiment of the present invention.

FIG. 5 shows still another embodiment of the present invention. Here, a mirror segment 17 is mounted in front of camera lens 19, as it was in FIG. 2 of the invention. An image source 11 is mounted above said mirror 17. A planar fully silvered mirror 22a is placed in front of image source 11 to receive its display and reflect it on to mirror segment 17. This folded light path embodiment like that of FIGS. 3 and 4, is particularly useful where excessive overhang of the recording camera 18 is undesirable for handling purposes.

Instead of using a partially reflective mirror in the various embodiments of this invention, a similar result can be achieved using a dichroic mirror, spherical or planar, in front of camera lens 19, in FIGS. 2 through 5. The dichroic mirror must be fashioned so that it will allow all but a narrow range of light frequencies to pass through it and be photographed by camera 18. A mirror could be coated, for example, so that it would reflect only a narrow range of intense greens of between 540 and 546 nanometers in wavelength. The image source 11 could be designed to emit light only at these frequencies. The dichroic mirror would therefore reflect substantially all light coming from image source 11 to the viewer 29. The mirror would allow all other frequencies to pass through it, so the camera 18 located directly behind it would sense virtually full color. The operator could boost the sensitivity of camera 18 to greens within the spectrum from those reflected by the dichroic mirror to compensate for it and thereby record virtually full color.

In the embodiments described above, except those using both the planar and spherical mirrors, those skilled in the art will have no difficulty selecting and positioning mirrors to meet their needs. The parameters of the folded light path designs can also be worked out through experimentation or by applying the information set forth above and basic principles of optics. To facilitate building the most complex embodiment, however, the one set forth in FIGS. 3 and 4, an example of how the mirrors and image source might be designed and positioned in a prompter is here provided.

EXAMPLE

Assume a designer wishes to magnify a three by four inch image three and one half times without obscuring the ±15° field of view of the movie camera lens mounted directly behind his mirror segment. Experimentation shows that the cathode ray tube, or other image source, should be located with its closest edge six inches in front of the camera lens and six inches below its optical center. The cathode ray tube's screen should be titled forward toward the viewer at an angle of 34° below the horizontal axis of the movie camera's lens.

The partially reflective planar mirror should be rectangular. It should measure 16" in width and 12" from top to bottom. The mirror should be inclined forward at its bottom at an angle of 63.5° from the horizontal. Its bottom should be parallel with the bottom of the housing. Its center should be located 2" in front of the camera lens.

The concave spherical mirror segment should also be rectangular. It should have a radius of curvature of 50" and should measure 11" from front to back and 16" from side to side. Its forward edge should be located about 9" above the center line of the camera lens. Its rear edge should be located 13" above the center line and 4½" in front of the front of the camera lens.

Figure 6:
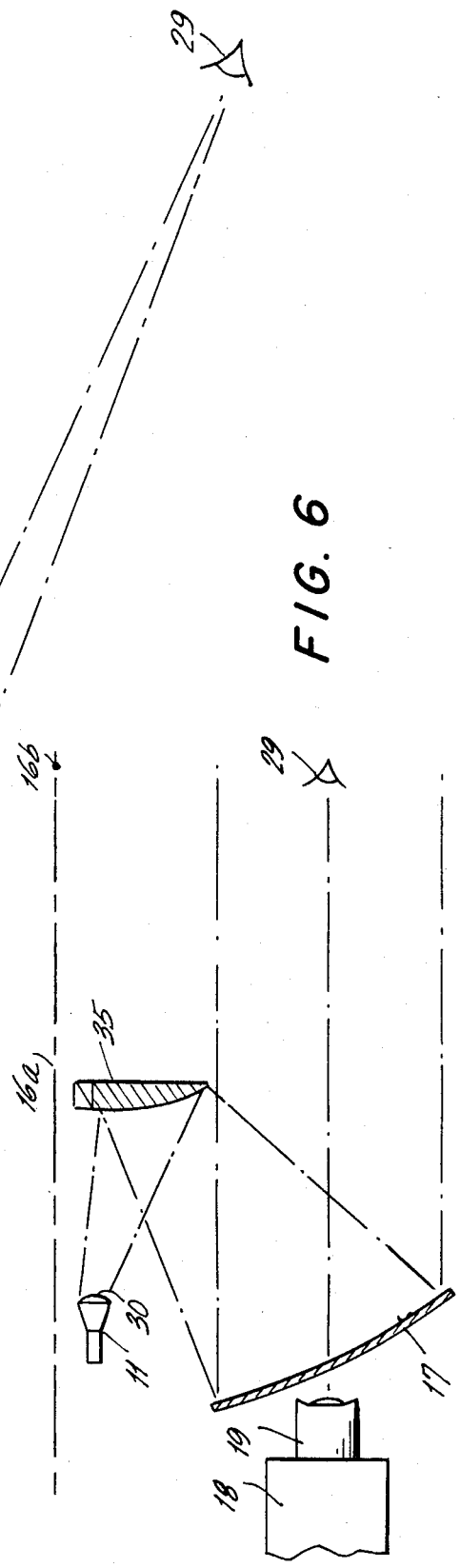
FIG. 6 is a view similar to FIG. 5 showing a further embodiment of the invention.

It is within the purview of the present invention to substitute a convex front surface mirror segment 35 as shown in FIG. 6 for the planar mirror 22a shown in FIG. 5. The convex front surface mirror 35 will provide better off-axis imaging as the viewer moves from left to right or from up to down with respect to optical axis. The precise optics of the convex mirror 35 will vary in accordance with well known optical principles and need not be described, therein.

Having thus fully described the invention, what is claimed and desired to be secured and protected by Letters Patent is as follows:

1. A virtual image display apparatus comprising a mirror in the shape of a substantially concave segment of a hemisphere said spherical mirror having an optical axis and a focus, an image source means for said mirror segment, and an image display face on said image source disposed substantially perpendicular to said optical axis but located off said axis and substantially on the same side of the axis as the line of sight of an observer and between said focus and said mirror segment.

2. A virtual image display apparatus according to claim 1 wherein said mirror segment is a partially reflective mirror.

3. A virtual image display apparatus according to claim 1 wherein a partially reflective planar mirror is angularly positioned between said mirror segment and said image source to receive light reflected by the mirror segment and direct it in a path across the optical axis of said mirror segment.

4. A virtual image display apparatus according to claim 1 wherein a fully reflective mirror is placed substantially in front of said image source laterally displaced from the concave mirror segment and substantially parallel to the light emitting image display face of said image source and wherein the said image display face is directed away from said mirror segment.

5. A virtual image display apparatus according to claim 1 wherein said image source means is a cathode ray tube.

6. A virtual image display apparatus according to claim 1 wherein said image source means is a thin film cathode ray tube.

7. A virtual image display apparatus according to claim 1 wherein said image source means is a liquid crystal display apparatus.

8. A virtual image display apparatus according to claim 1 wherein said image source means is a light emitting diode array.

9. A virtual image display device according to claim 1 wherein said image source means is an electroluminescent panel.

10. A virtual image display device according to claim 1 wherein said image source means is a tungsten filament projector.

11. A virtual image display device according to claim 1 wherein said image source means is a gaseous plasma discharge cell.

12. A virtual image display device according to claim 1 wherein said image source is a back illuminated film or transparency.

13. A virtual image display device according to claim 1 wherein said image source means is a front illuminated partially reflecting original.

14. A virtual image display device according to claim 1 wherein said mirror segment is dichroic.

15. A virtual image display apparatus according to claim 3 wherein said partially reflective planar mirror is dichroic.

16. A virtual image display apparatus according to claim 1 wherein said image source is slidably carried by a support located between said mirror segment and said focus, whereby said image source may be moved so as to decrease or increase the degree to which its image is magnified by the virtual image display apparatus without changing the vertical position of the virtual image with respect to the mirror segment.

17. A virtual image display apparatus according to claim 4 in which the fully reflective mirror is a curved front surface mirror.

18. A virtual image display apparatus according to claim 4 in which the fully reflective mirror is a planar mirror.

* * * * *